(12) United States Patent
Zolna et al.

(10) Patent No.: US 12,576,515 B2
(45) Date of Patent: Mar. 17, 2026

---

(54) OFF-LINE LEARNING FOR ROBOT CONTROL USING A REWARD PREDICTION MODEL

(71) Applicant: GDM Holding LLC, Mountain View, CA (US)

(72) Inventors: Konrad Zolna, London (GB); Scott Ellison Reed, Atlanta, GA (US)

(73) Assignee: GDM Holding LLC, Mountain View, CA (US)

( * ) Notice: Subject to any disclaimer, the term of this patent is extended or adjusted under 35 U.S.C. 154(b) by 548 days.

(21) Appl. No.: 18/018,421

(22) PCT Filed: Jul. 27, 2021

(86) PCT No.: PCT/EP2021/071079
§ 371 (c)(1),
(2) Date: Jan. 27, 2023

(87) PCT Pub. No.: WO2022/023386
PCT Pub. Date: Feb. 3, 2022

(65) Prior Publication Data
US 2023/0256593 A1      Aug. 17, 2023

Related U.S. Application Data

(60) Provisional application No. 63/057,850, filed on Jul. 28, 2020.

(51) Int. Cl.
*B25J 9/16* (2006.01)
*G06N 3/092* (2023.01)

(52) U.S. Cl.
CPC .............. *B25J 9/161* (2013.01); *B25J 9/163* (2013.01); *G06N 3/092* (2023.01)

(58) Field of Classification Search
CPC ........... B25J 9/161; B25J 9/163; G06N 3/045; G06N 3/006; G06N 3/0464; G06N 3/0895; G06N 3/092; G06N 3/08; G06N 7/01
See application file for complete search history.

(56) References Cited

U.S. PATENT DOCUMENTS 8,908,044 B2 * 12/2014 Luo ....................... G01J 1/0228
                                                         348/162
9,147,338 B2 * 9/2015 Hunter ................... G08B 19/00
                    (Continued)

FOREIGN PATENT DOCUMENTS

CN        110119844 A      8/2019

OTHER PUBLICATIONS

Moridian et al., Learning Navigation Tasks from Demonstration for Semi-Autonomous Remote Operation of Mobile Robots, 2018, IEEE, p. 1-8 (Year: 2018).*
                    (Continued)

*Primary Examiner* — McDieunel Marc
(74) *Attorney, Agent, or Firm* — Fish & Richardson P.C.

(57)            ABSTRACT

Methods, systems, and apparatus, including computer programs encoded on computer storage media, for off-line learning using a reward prediction model. One of the methods includes obtaining robot experience data; training, on a first subset of the robot experience data, a reward prediction model that receives a reward input comprising an input observation and generates as output a reward prediction that is a prediction of a task-specific reward for the particular task that should be assigned to the input observation; processing experiences in the robot experience data using the trained reward prediction model to generate a respective reward prediction for each of the processed experiences; and training a policy neural network on (i) the processed expe-
                    (Continued)

riences and (ii) the respective reward predictions for the processed experiences.

20 Claims, 3 Drawing Sheets

(56)                    References Cited

U.S. PATENT DOCUMENTS

| | | | | |
|---|---|---|---|---|
| 11,712,799 | B2 * | 8/2023 | Cabi | G06N 3/042 |
| | | | | 700/245 |
| 12,061,481 | B2 * | 8/2024 | Toshev | G06N 3/006 |
| 2013/0155252 | A1 * | 6/2013 | Luo | G01J 1/0219 |
| | | | | 348/162 |
| 2017/0302951 | A1 * | 10/2017 | Joshi | H04N 19/46 |
| 2020/0104680 | A1 | 4/2020 | Reed et al. | |

OTHER PUBLICATIONS

Oudeyer et al., Intrinsic Motivation Systems for Autonomous Mental Development, 2007, IEEE, p. 265-279 (Year: 2007).*
Pfeiffer et al., Reinforced Imitation: Sample Efficient Deep Reinforcement Learning for Mapless Navigation by Leveraging Prior Demonstrations, 2018, IEEE, p. 4423-4430 (Year: 2018).*
Khan et al., Learning Sample-Efficient Target Reaching for Mobile Robots, 2018, IEEE, p. 3080-303087 (Year: 2018).*
Hafez et al., Efficient Intrinsically Motivated Robotic Grasping with Learning-Adaptive Imagination in Latent Space, 2019, IEEE, p. 240-246 (Year: 2019).*
Buehler et al., Online inference of human belief for cooperative robots, 2018, IEEE, p. 409-415 (Year: 2018).*
Office Action in Chinese Appln. No. 202180049339.9, mailed on May 6, 2025, 26 pages (with English translation).
Office Action in European Appln. No. 21751553.5, mailed on Apr. 23, 2025, 8 pages.
Weiming et al., "Semi-supervised dynamic soft measurement modeling method based on recurrent neural networks," Journal of Electronic Measurement and Instrumentation, Nov. 15, 2019, 33(11):7-13 (with machine translation).
Decision to Grant Patent in Japanese Appln. No. 2023-506025, dated Aug. 5, 2024, 5 pages (with English translation).
Abbeel et al., "Apprenticeship learning via inverse reinforcement learning," ICML '04: Proceedings of the twenty-first international conference on Machine learning, Jul. 4, 2004, 8 pages.
Baram et al., "End-to-end differentiable adversarial imitation learning," Proceedings of the 34th International Conference on Machine Learning, 2017, 70:390-399.
Barth-Maron et al., "Distributed distributional deterministic policy gradients," CoRR, Apr. 23, 2018, arxiv.org/abs/1804.08617, 16 pages.
Cabi et al., "Scaling data-driven robotics with reward sketching and batch reinforcement learning," CoRR, Sep. 26, 2019, arxiv.org/abs/1909.12200, 11 pages.
Chen et al., "BAIL: Best-action imitation learning for batch deep reinforcement learning," 34th Conference on Neural Information Processing Systems, 2020, 11 pages.
Elkan et al., "Learning classifiers from only positive and unlabeled data," KDD '08: Proceedings of the 14th ACM SIGKDD international conference on Knowledge discovery and data mining, Aug. 2008, pp. 213-220.
Finn et al., "Guided cost learning: Deep inverse optimal control via policy optimization," Proceedings of The 33rd International Conference on Machine Learning, 2016, 48:49-58.
Fu et al., "D4RL: Datasets for Deep Data-Driven Reinforcement Learning," CoRR, Jun. 27, 2020, arXiv:2004.07219v3, 15 pages.
Fu et al., "Learning robust rewards with adversarial inverse reinforcement learning," CoRR, Oct. 30, 2017, arxiv.org/abs/1710.11248, 15 pages.

Fujimoto et al., "Off-policy deep reinforcement learning without exploration," Proceedings of the 36th International Conference on Machine Learning, 2019, 97:2052-2062.
Gülçehre et al., "RL unplugged: Benchmarks for offline reinforcement learning," CoRR, Jun. 24, 2020, arxiv.org/abs/2006.13888, 12 pages.
Ho et al., "Generative adversarial imitation learning," Advances in Neural Information Processing Systems 29 (NIPS 2016), 2016, 9 pages.
International Preliminary Report on Patentability in International Appln. No. PCT/EP2021/071079, dated Feb. 9, 2023, 11 pages.
International Search Report and Written Opinion in International Appln. No. PCT/EP2021/071079, dated Nov. 5, 2021, 18 pages.
Lange et al., "Batch reinforcement learning," Reinforcement learning, Mar. 5, 2012, 12:45-72.
Levine et al., "Offline reinforcement learning: Tutorial, review, and perspectives on open problems," CoRR, May 4, 2020, arXiv:2005.01643, 43 pages.
Li et al., "InfoGAIL .; Interpretable imitation learning from visual demon strations," Advances in Neural Information Processing Systems 30 (NIPS 2017), 2017, 11 pages.
Merel et al., "Learning human behaviors from motion capture by adversarial imitation," CoRR, Jul. 7, 2017, arXiv:1707.02201, 12 pages.
Nair et al., "Overcoming exploration in reinforcement learning with demonstrations," 2018 IEEE International Conference on Robotics and Automation (ICRA), May 21-25, 2018, 8 pages.
Ng et al., "Algorithms for inverse reinforcement learning," ICML, Jun. 29, 2000, 1:2.
Office Action in Japanese Appln. No. 2023-506025, dated Mar. 4, 2024, 6 pages (with English translation).
Osa et al., "An algorithmic perspective on imitation learning," Foundations and Trends in Robotics, Mar. 26, 2018, 7(1-2):1-79.
Paine et al., "Hyperparameter selection for offline reinforcement learning," CoRR, Jul. 17, 2020, arXiv:2007.09055, 19 pages.
Paine et al., "Making efficient use of demonstrations to solve hard exploration problems," CoRR, Sep. 3, 2019, arxiv.org/abs/1909.01387, 22 pages.
Peng et al., "Advantage-weighted regression: Simple and scalable off-policy reinforcement learning," CoRR, Oct. 1, 2019, arXiv:1910.00177, 19 pages.
Pohlen et al., "Observe and look further: Achieving consistent performance on Atari," CoRR, May 29, 2018, arXiv:1805.11593, 19 pages.
Pomerleau, "ALVINN: An autonomous land vehicle in a neural network," Advances in Neural Information Processing Systems 1 (NIPS 1988), 1988, pp. 305-313.
Rajeswaran et al., "Learning complex dexterous manipulation with deep reinforcement learning and demonstrations," CoRR, Sep. 28, 2017, arxiv.org/abs/1709.10087, 9 pages.
Reddy et al., "SQIL: imitation learning via reinforcement learning with sparse rewards," CoRR, May 27, 2019, arxiv.org/abs/1905.11108, 14 pages.
Ross et al., "A reduction of imitation learning and structured prediction to No. regret online learning," Proceedings of the Fourteenth International Conference on Artificial Intelligence and Statistics, 2011, 15:627-635.
Siegel et al., "Keep doing what worked: Behavior modelling priors for offline reinforcement learning," CoRR, Feb. 19, 2020, arxiv.org/abs/2002.08396, 21 pages.
Vecerik et al., "A practical approach to insertion with variable socket position using deep reinforcement learning," 2019 International Conference on Robotics and Automation, May 20-24, 2019, 7 pages.
Vecerik et al., "Leveraging demonstrations for deep reinforcement learning on robotics problems with sparse rewards," CoRR, Jul. 27, 2017, arxiv.org/abs/1707.08817, 10 pages.
Wang et al., "Critic regularized regression," 34th Conference on Neural Information Processing Systems (NeurIPS 2020), 2020, 11 pages.
Wang et al., "Exponentially weighted imitation learning for batched historical data," 32nd Conference on Neural Information Processing Systems, 2018, 10 pages.

(56) References Cited

OTHER PUBLICATIONS

Xu et al., "Positive-unlabeled reward learning, " CoRR, Nov. 1, 2019, arxiv.org/abs/1911.00459, 18 pages.

Zhu et al., "Reinforcement and imitation learning for diverse visuomotor skills," CoRR, Feb. 26, 2018, arxiv.org/abs/1802.09564, 12 pages.

Zolna et al., "Combating false negatives in adversarial imitation learning, " CoRR, Feb. 2, 2020, arxiv.org/abs/2002.00412, 9 pages.

Zolna et al., "Offline Learning from Demonstrations and Unlabeled Experience," CoRR, Nov. 27, 2020, arXiv:2011.13885v1, 13 pages.

Zolna et al., "Reinforced imitation in heterogeneous action space," CoRR, Apr. 6, 2019, arXiv:1904.03438, 17 pages.

Zolna et al., "Task-relevant adversarial imitation learning," CoRR, Oct. 2, 2019, arXiv:1910.01077, 17 pages.

Office Action in Korean Appln. No. 10-2023-7002829, mailed on Oct. 24, 2025, 18 pages (with English translation).

* cited by examiner

OFF-LINE LEARNING FOR ROBOT CONTROL USING A REWARD PREDICTION MODEL

CROSS-REFERENCE TO RELATED APPLICATIONS

This application is a National Stage Application under 35 U.S.C. § 371 and claims the benefit of International Application No. PCT/EP2021/071079, filed Jul. 27, 2021, which claims the benefit of the filing date of U.S. Provisional Patent Application Ser. No. 63/057,850, which was filed on Jul. 28, 2020, and which is incorporated by reference herein in its entirety.

BACKGROUND

This specification relates to controlling robots using neural networks. Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of weights.

SUMMARY

This specification describes a system implemented as computer programs on one or more computers in one or more locations that trains a policy neural network that is used to control a robot, i.e., to select actions to be performed by the robot while the robot is interacting with an environment, in order to cause the robot to perform a particular task.

Particular embodiments of the subject matter described in this specification can be implemented so as to realize one or more of the following advantages.

Robotic manipulation tasks may have sparse or unobtainable reward signals, and complex visual observations. Existing behavior cloning (BC) agents can sometimes solve these tasks by supervised learning on expert demonstrations, from pixels and without rewards. However, because supervised policies only regress on expert trajectories, they do not leverage potentially vast amounts of data from other agents and other tasks. This specification describes techniques for training a policy on both demonstrations and on a large amount of unlabeled trajectories as follows: (1) learn a reward function by contrasting expert and unlabeled observations, (2) annotate some or all of the data with the learned reward function, and (3) train an offline reinforcement learning agent on the annotated data. Across several continuous control tasks, the described techniques consistently outperform BC with an equal number of demonstrations and no task rewards. Furthermore, the performance of the described techniques scales with the number of unlabeled trajectories across several orders of magnitude. Additionally, for several tasks, the described techniques outperform BC with only 10% of the demonstrations. Moreover, the described techniques are robust to low-quality unlabeled trajectories. In an example described herein, a method comprises obtaining robot experience data characterizing robot interactions with an environment. The robot experience data may comprise a plurality of experiences, including (i) an observation characterizing a state of the environment and (ii) an action performed by a respective robot in response to the observation. The experiences comprises expert experiences from episodes of a particular task being performed by an expert agent and unlabeled experiences. At least some of the unlabeled experiences may include experiences that are not related to the particular task, or not identifiable as relating to the particular task. The method includes training, on a first subset of the robot experience data, a reward prediction model that receives a reward input comprising an input observation and generates as output a reward prediction that is a prediction of a task-specific reward for the particular task that should be assigned to the input observation. Training the reward prediction model comprises optimizing an objective function that includes a first term that encourages the reward prediction model to assign, to observations from expert experiences, a first reward value that indicates that the particular task was completed successfully after the environment was in the state characterized by the observation, and includes a second term that encourages the reward prediction model to assign, to observations from unlabeled experiences, a second reward value that indicates that the particular task was not completed successfully after the environment was in the state characterized by the observation. Experiences in the robot experience data are processed using the trained reward prediction model to generate a respective reward prediction for each of the processed experiences and a policy neural network is trained on (i) the processed experiences and (ii) the respective reward predictions for the processed experiences, wherein the policy neural network is configured to receive a network input comprising an observation and to generate a policy output that defines a control policy for a robot performing the particular task.

A robot may be controlled using the trained policy neural network while the robot performs the particular task. For example, observations may be obtained from one or more sensors sensing a real-world environment and the observations may be provided as inputs to the trained policy neural network. The inputs may be used by the policy neural network to generate an output, and the output of the trained policy neural network used to select actions to control the robot to perform the particular task.

Data specifying the trained policy neural network may be provided for use in controlling a robot while the robot performs the particular task.

The first subset may include the expert experiences and a proper subset of the unlabeled experiences.

The objective function may include a third term that encourages the reward prediction model to assign, to observations from expert experiences, the second reward value. The first and second terms may have a different sign from the third term in the objective function.

The objective function includes a fourth term (in addition to, or alternatively to the third term) that penalizes the reward prediction model for correctly distinguishing expert experiences from unlabeled experiences based on a first predetermined number of observations of an episode of the particular task being performed by an expert agent.

Training the policy neural network may comprise training the policy neural network on (i) the experiences and (ii) the respective reward predictions for the experiences using an off-line reinforcement learning technique. The off-line reinforcement learning technique may be an off-line actor-critic technique. The off-line reinforcement learning technique is Critic-Regularized Regression (CRR).

Training the reward prediction model may comprises applying data augmentation to the experiences in the robot experience data that are used for the training of the reward prediction model.

At least some of experiences of the first subset of the robotic experience data relate to a real-world environment.

In another example described herein, a system comprises one or more computers and one or more storage devices storing instructions that are operable, when executed by the one or more computers, to cause the one or more computers to perform the operations of any of the methods described herein.

A computer storage medium may be provided, which may be encoded with instructions that, when executed by one or more computers, cause the one or more computers to perform the operations of the any of the methods described herein.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
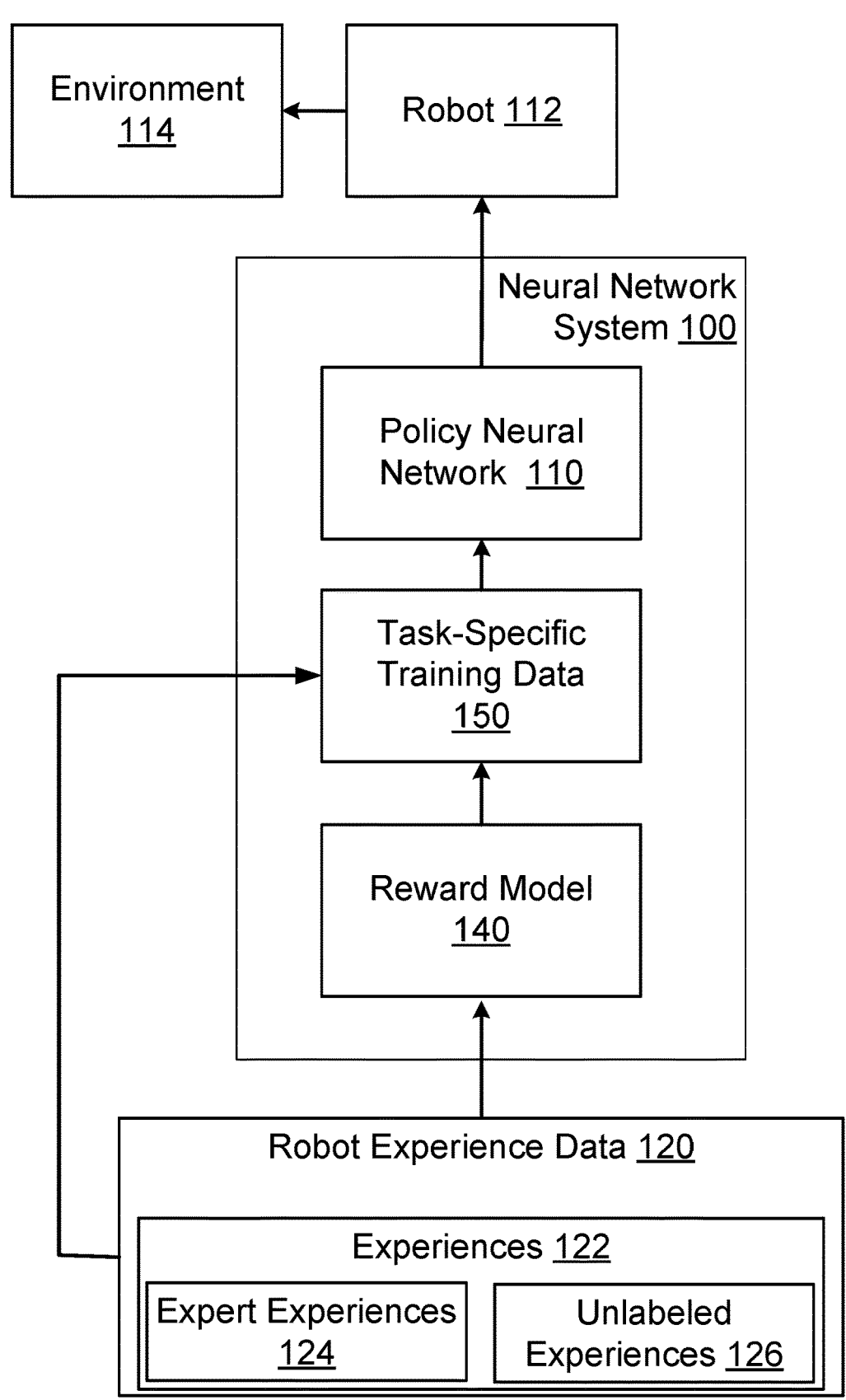
FIG. 1 shows an example neural network training system.

FIG. 1 shows an example neural network training system 100. The system 100 is an example of a system implemented as computer programs on one or more computers in one or more locations, in which the systems, components, and techniques described below can be implemented.

The system 100 trains a policy neural network 110 that is used to control a robot 112, i.e., to select actions to be performed by the robot while the robot 112 is interacting with an environment 114, in order to cause the robot 112 to perform a particular task.

For example, the particular task can include causing the robot 112 to navigate to different locations in the environment, causing the robot 112 to locate different objects, causing the robot 112 to pick up different objects or to move different objects to one or more specified locations, and so on.

It is to be understood that references in this specification to controlling a robot includes control any type of physical (i.e. real-world) agent. The agent may be a mechanical agent, e.g., an autonomous vehicle, a control system for an industrial facility, e.g., a data center or a power grid, an individual actuator or multiple distributed actuators. The physical agent may be electrical. For example, techniques described in this specification can be used to control generation of voltages or currents within one or more components of a system, e.g., controlling lamps such as LEDs or X-rays, controlling generation of an electromagnetic field, or any control of other electrical component. For example, sensors may monitor a condition of a subject within an X-ray machine, such as a human or animal patient, and the policy neural network 110 may control the generation of X-rays within the X-ray machine.

The techniques described in this specification can also be used to train a policy neural network to control a software agent, e.g., one that controls a simulated robot or vehicle in a virtual environment or one that controls a user interface.

A software agent may be controlled based on real-world inputs, such as sensor data from real-world sensors or based on virtual inputs, e.g., outputs from virtual sensors which obtain inputs from a virtual environment. Similarly, a real-world agent may be controlled based on real-world inputs or virtual inputs. A virtual environment may be constructed based on real-world inputs. For example, sensor data relating to interactions in a real-world environment may be obtained and that sensor data may be used to create a virtual environment.

Each input to the policy neural network 110 can include an observation characterizing the state of the environment being interacted with by the agent and the output of the policy neural network ("policy output") can define an action to be performed by the agent in response to the observation, e.g., an output that defines a probability distribution over possible actions to be performed by the agent.

The observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In other words, the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

The actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment.

In one example, the observations each include one or more images of an environment captured by one or more cameras, e.g., a camera sensor of a robot, one or more cameras located at different locations in the environment external from the robot, or both, and lower-dimensional proprioceptive features of the robot.

As a particular example, each input to the policy neural network 110 can include an action and an observation and the output of the policy neural network 110 can be a Q value that represents a predicted return that would be received by the robot as a result of performing the action in response to the observation.

A return refers to a cumulative measure of rewards received by the agent 112, for example, a time-discounted sum of rewards. Generally, a reward is a scalar numerical value and characterizes, e.g., a progress of the agent towards completing a task.

As a particular example, the reward can be a sparse binary reward that is zero unless the task is successfully completed and one if the task is successfully completed as a result of the action performed.

As another particular example, the reward can be a dense reward that measures a progress of the robot towards completing the task as of individual observations received during an episode of attempting to perform the task. That is, individual observations can be associated with non-zero reward values that indicate the progress of the robot towards completing the task when the environment is in the state characterized by the observation.

The system 100 can then control the robot 112 based on the Q values for the actions in the set of actions, e.g., by selecting, as the action to be performed by the robot 112, the action with the highest Q value.

As another particular example, each input to the policy neural network 110 can be an observation and the output of the policy neural network 110 can be a probability distribution over the set of actions, with the probability for each action representing the likelihood that performing the action in response to the observation will maximize the predicted return. The system 100 can then control the robot 112 based on the probabilities, e.g., by selecting, as the action to be performed by the robot 112, the action with the highest probability or by sampling an action from the probability distribution.

In some cases, in order to allow for fine-grained control of the agent, the system 100 can treat the space of actions to be performed by the robot, i.e., the set of possible control inputs, as a continuous space. Such settings are referred to as continuous control settings. In these cases, the output of the policy neural network 110 can be the parameters of a multi-variate probability distribution over the space, e.g., the means and covariances of a multi-variate Normal distribution.

The policy neural network 110 can have any appropriate architecture that allows the policy neural network 110 to process an observation to generate a policy output.

As a particular example, when the observations include high-dimensional sensor data, e.g., images or laser data, the policy neural network 110 can be a convolutional neural network. As another example, when the observations include only relatively lower-dimensional inputs, e.g., sensor readings that characterize the current state of the robot, the policy neural network 110 can be a multi-layer perceptron. As yet another example, when the observations include both high-dimensional sensor data and lower-dimensional inputs, the policy neural network 110 can include a convolutional encoder that encodes the high-dimensional data, a fully-connected encoder that encodes the lower-dimensional data, and a policy subnetwork that operates on a combination, e.g., a concatenation, of the encoded data to generate the policy output.

To allow the system 100 to train the neural network 110, the system 100 obtains robot experience data 120. Generally, the robot experience data 120 is data that characterizes robot interactions with the environment 114.

In some cases, the robot experience data 120 characterizes real-world interactions of real-world robots with the real-world environment.

In some other cases, the robot experience data 120 characterizes the interactions of a simulated version that is a computer simulation of the robot 112 with a simulated environment that is a computer simulation of the environment 114. After training using the simulated experience data, the policy neural network 110 can then be used to control the real-world robot 112 in the real-world environment 114. Training in a simulated environment can enable the neural network 110 to learn from large amounts of simulated training data while avoiding risks associated with the training in a real world environment, e.g., damage to the robot due to performing poorly chosen actions or general wear and tear on the robot due to repeated interactions with the real-world environment.

The robot experience data 120 includes experiences 122 that, in turn, each include an observation and an action performed by a robot in response to the observation.

This robot experience data 120 can include a large amount of experiences 122 collected while one or more robots perform various different tasks or randomly interact with the environment. However, the robot experience data 120 is generally not associated with rewards for the particular task, which are required to train the policy neural network 110 through reinforcement learning. That is, although task-specific rewards for the particular task are required in order to train the policy neural network 110 to control the robot 112 to perform the particular task, no such rewards are available in the robot experience data 120.

More specifically, the robot experience data 120 will generally include a small amount of expert experience data 124 collected while an expert agent, e.g., a robot controlled by a user or by an already-learned policy, successfully performs the particular task.

Moreover, the robot experience data 120 will generally additionally include a large number of unlabeled experiences 126. Unlabeled experiences are those for which the system 100 has no access to a reward for the particular task and has no indication of whether the experience was collected while successfully performing the particular task.

For example, the unlabeled experiences can include experiences that were collected while one or more robots were performing different tasks or randomly interacting with the environment. As a particular example, the robot experience data 120 can include data collected from interactions of a plurality of robots while performing a plurality of different tasks. For example, the system 100 may have previously trained one or more other policy neural networks to control robots to perform other tasks, and the robot experience data 120 can include any data collected as a result of the previous training.

As another example, the unlabeled experiences can include experiences collected while one or more robots attempt to perform the particular task, but with no indication of whether the particular task was successfully performed during the corresponding trajectory for any given unlabeled experience.

Thus, although a large amount of data 120 may be available to the system 100, the system 100 cannot directly use the data 120 to train the policy neural network 110 because the experiences in the experience data 120 are not associated with rewards for the particular task.

To allow the system 100 to train the policy neural network 110 using the data 120, the system uses the experience data 120 to train a reward prediction model 140 that receives as input an input observation and generates as output a reward prediction that is a prediction of a task-specific reward for the particular task that should be assigned to the input observation. Thus, after training, the trained reward prediction model 140 can predict task-specific rewards for observations even if those observations were not generated while a robot was performing the particular task.

The reward prediction model 140 can have any appropriate architecture that allows the model 140 to process an observation to generate a reward prediction. In particular, the reward prediction model 140 can have a similar architecture as the policy neural network 110, but with a different output layer that allows reward prediction model 140 to generate an output that is a single value rather than a potentially multi-valued policy output.

The system 100 uses the reward prediction model 140 to generate task-specific training data 150 for the particular task that associates each of a plurality of the experiences 122 in the experience data 120 with a task-specific reward for the particular task.

In particular, for each experience in a second subset of the experiences 122 in the robot experience data 120, the system 100 processes the observation in the experience using the reward prediction model 140 to generate a reward prediction, and associates the reward prediction with the experience.

By generating training data 150 in this way, the system 100 can generate a large amount of training data for the particular task from only a small amount of expert experiences.

The system 100 then trains the policy neural network 110 on the task-specific training data 150 for the particular task, e.g., using off-line reinforcement learning. Where training is done entirely off-line, the system can train the policy neural network 110 on a large amount of data with no additional robot environment interaction, i.e., no environment interaction in addition to the interactions that were already reflected in the robot experience data 120. Avoiding this additional robot environment interaction can allow a robot to be trained to interact with a real-world environment without requiring any additional wear and tear on the robot and without any additional actions being performed that can be unsafe and cause damage to the robot, the environment, or both.

In some implementations, the system 100 first trains the reward prediction model 140 to completion and then trains the policy neural network 110 using the reward prediction model 140 after the reward prediction model 140 has been trained to completion.

In some other implementations, the system 100 repeatedly updates both the reward prediction model 140 and the policy neural network 110 at each of multiple training iterations. That is, the system 100 performs multiple training iterations during the training of the policy neural network 110 and, at each iteration, updates the reward prediction model 140 and then uses the updated reward prediction model 140 to generate task-specific training data 150 for updating the policy neural network 110 at the iteration.

The operation of the system 100 to train the policy neural network 110 starting from the robot experience data 120 is described in more detail below with reference to FIG. 2.

After the system 100 has trained the policy neural network 110, the system 100 can control the robot 112 while the robot 112 performs the particular task using the trained policy neural network 110.

Alternatively or in addition, the system can provide data specifying the trained policy neural network 110, i.e., the trained values of the parameters of the neural network, for use in controlling a robot while the robot performs the particular task. For example, the system can provide the data specifying the trained policy neural network, e.g., the trained parameter values of the parameters of the policy neural network 110, to another system over a data communication network or over a wired connection to allow the other system to control a robot while the robot performs the particular task.

In either of these cases, the system 100 can then obtain experiences generated as a result of controlling a robot using the trained policy neural network 110 to perform the particular task and add the experiences to the robot experience data 120. In this way, the experiences become available for use in training another neural network to control a robot to perform another task. Thus, the amount of experiences in the robot experience data 120 can continue to increase and continue to be re-purposed by the system 100 for learning new tasks, even though none of the experience data 120 is associated with task rewards for the new tasks or was generated while a robot was performing the new task.

Figure 2:
FIG. 2 is a flow diagram of an example process for training a policy neural network.
Figure 2:
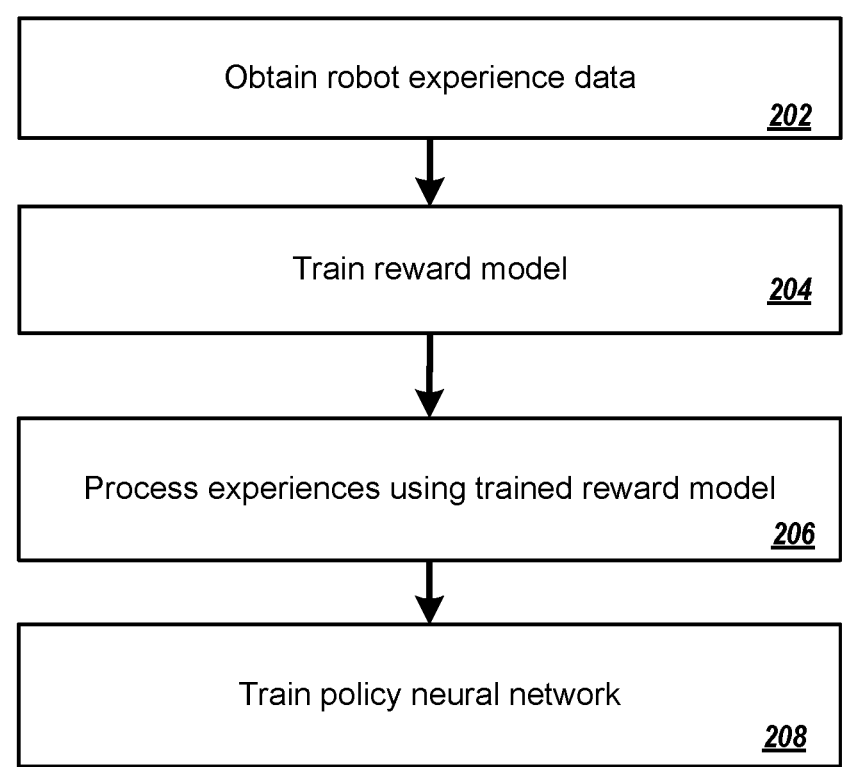

FIG. 2 is a flow diagram of an example process 200 for training a policy neural network using a reward prediction model. For convenience, the process 200 will be described as being performed by a system of one or more computers located in one or more locations. For example, a neural network training system, e.g., the neural network training system 100 of FIG. 1, appropriately programmed, can perform the process 200.

The system obtains robot experience data characterizing robot interactions with an environment (step 202).

In particular, the data includes experiences that each, in turn, include an observation and an action performed by a respective robot in response to the observation.

More specifically, the robot experience data includes expert experiences from episodes of a particular task being performed by an expert agent and unlabeled experiences that are not associated with any indication of whether they were collected while particular task was successfully performed.

The system trains, on a subset of the robot experience data, a reward prediction model (step 204). The reward prediction model receives a reward input that includes an input observation and generates as output a reward prediction that is a prediction of a task-specific reward for the particular task that should be assigned to the input observation, i.e., a numeric value that represents a prediction of a task-specific reward value for the particular task.

Generally, the subset of the robot experience data that is used to train the reward prediction model includes all of the expert experiences in the robot experience data obtained at step 202 and a proper subset of the unlabeled experiences obtained at step 202.

More specifically, the system trains the reward prediction model to optimize an objective function.

The objective function includes a first term that encourages the reward prediction model to assign, to observations from expert experiences, a first reward value, e.g., a value of one or another positive value, that indicates that the particular task was completed successfully after the environment was in the state characterized by the observation.

The objective function also includes a second term that encourages the reward prediction model to assign, to observations from unlabeled experiences, a second reward value, e.g., a value of negative one or a value of zero, that indicates that the particular task was not completed successfully after the environment was in the state characterized by the observation.

For example, the objective function can be a loss function L that satisfies:

$$L = \mathbb{E}_{s_t \sim \mathcal{D}_E} [-\log(R_\psi(s_t))] + \mathbb{E}_{s'_t \sim \mathcal{D}_U} [-\log(1-R_\psi(s'_t))],$$

where $\mathbb{E}$ is the expectation operator, $s_t$ is an observation from an experience sampled from the set of expert experiences $\mathcal{D}_E$ used to train the reward prediction model $R_\psi$ having parameters $\psi$, $R_\psi(s_t)$ is the reward prediction generated by the reward prediction model by processing an input that includes the observation $s_t$, $s'_t$ is an observation from an experience sampled from the set of unlabeled experiences $\mathcal{D}_U$ used to train the reward prediction model $R_\psi$, and $R_\psi(s'_t)$ is the reward prediction generated by the reward prediction model by processing an input that includes the observation $s'_t$.

The above loss function is minimized when the reward prediction model assigns a 1 to all observations from all expert experiences and 0 to all observations from unlabeled experiences, i.e., assigns to all observations from unlabeled experiences a reward value that indicates that the task will not be successfully performed after the observation is received. However, although the system does not have access to labels for the unlabeled experiences, the unlabeled experience data can contain successful experiences that occurred during trajectories in which the task was successfully performed in addition to unsuccessful experiences. In other words, the unlabeled experience data can include "false negatives," i.e., unlabeled experiences that should be assigned a reward value of one even though the loss function encourages the reward prediction model to assign them a reward value of zero. This existence of false negatives can, in some cases, decrease the usefulness of the trained reward prediction model in training the policy neural network.

To account for this, in some implementations, the objective function also includes, in addition to the first and second terms, a third term that encourages the reward prediction model to assign, to observations from expert experiences, the second reward value. In these implementations, the third term can have the opposite sign from the first and second terms and the first term can be scaled relative to the second term, i.e., have a lower weight than the second term in the loss function. By modifying the objective function in this manner, i.e., by scaling the first term and adding a third term that is also scaled relative to the second term but has the opposite sign from the second term, the system can effectively account for the presence of false negatives in the unlabeled experience data. As a particular example, in these implementations, the objective function can be a loss function L that satisfies:

$$\eta \, \mathbb{E}_{s_t \sim \mathcal{D}_E} [-\log(R_{104}(s_t))] + \mathbb{E}_{s'_t \sim \mathcal{D}_U} [-\log(1-R_\psi(s'_t))] - \eta \, \mathbb{E}_{s_t \sim \mathcal{D}_E} [-\log(1-R_\psi(s_t))],$$

where $\eta$ is a hyperparameter that is set to a positive value between zero and one.

In some implementations, instead of or in addition to the third term, the reward function includes a fourth term that penalizes the reward prediction model for accurately distinguishing whether early observations at the very start of an episode come from the expert experiences or the unlabeled experiences. As used in this specification, an "episode" is a sequence of experiences arranged in chronological order in which the robot attempts to perform some task starting from a corresponding initial environment state or a sequence of experiences arranged in chronological order in which the robot interacts randomly with the environment starting from a corresponding initial environment state.

That is, early observations in an episode of interaction generally do not reflect behavior that is specific to the particular task, i.e., because at the beginning of an episode of interaction the robot has not yet performed any meaningful actions that would be indicative of whether the agent will later in the episode successfully perform the particular task. In other words, the same early observation could be received if the agent is interacting randomly, performing another task, or performing the particular task.

As a particular example, the system can identify the first n observations, e.g., the first five, ten, or twenty, observations, in any given episode as early observations. Then the system can sample the early observations from one unlabeled episode and the early observations from one expert episode and compute the average of the reward predictions generated by the reward model for the early observations from the unlabeled episode ("unlabeled average") and the average of the reward predictions generated by the reward model for the early observations from the expert episode ("expert average").

If the expert average is not higher than the unlabeled average, the system sets the fourth term to zero.

If the expert average is higher than the unlabeled average, the system sets the fourth term equal to the negative of the above loss, e.g., the loss with only the first and second terms or the loss with the first, second and third terms, computed over the early observations from the expert and unlabeled episodes.

Thus, the system uses the early observations to first control if the reward model is overfitting to early observations, i.e., by virtue of the expert average being higher than the unlabeled average, and, if so, the system uses the early observations again to compute a reversed loss to regularize the training of the reward model.

The system can train the reward prediction model to optimize the reward prediction objective function using any appropriate neural network training technique, e.g., any gradient-based technique, e.g., stochastic gradient descent, techniques that use the Adam optimizer, the rmsprop optimizer, and so on.

In some implementations, prior to training the reward prediction model on the subset of experiences, the system applies data augmentation to the experiences in the robot experience data that are used for the training of the reward prediction model. In some cases, given that the expert experiences can be very limited in size, the reward model can achieve "high" performance by simply memorizing all the expert states and blindly assigning reward 0 to all the other states. Applying data augmentation to the experiences that are used to train the reward model can help alleviate this problem. Generally, data augmentation can include using techniques to increase the number of, or to modify, the experiences in the expert experiences and optionally the unlabeled experiences. For example, images may be distorted, rotated, or cropped, sensor inputs (e.g. from sensors) may be dropped or augmented with random noise, and so on. Examples of specific data augmentation techniques that can be applied are described in Konrad Zolna, Scott Reed, Alexander Novikov, Sergio Gomez Colmenarej, David Budden, Serkan Cabi, Misha Denil, Nando de Freitas, and Ziyu Wang. Task-relevant adversarial imitation learning, Supplementary Materials B. In CoRL, 2020.

The system processes each of the experiences in the robot experience data using the trained reward prediction model to generate a respective reward prediction for each of the experiences (step 206). That is, for each experience, the system processes a reward input that includes the observation from the experience using the reward model after the training in step 204 is performed to generate a respective reward prediction for the experience.

The system trains the policy neural network on (i) the experiences and (ii) the respective reward predictions for the experiences (step 208).

Generally, the system can train the policy neural network on (i) the experiences and (ii) the respective reward predictions for the experiences using an off-policy reinforcement learning technique. Because the technique is "off-policy," i.e., does not require that any experience on which the neural network is being trained be generated using the current version of the neural network, the system can train the policy neural network on the task-specific training data entirely "off-line," i.e., without needing to control the robot using the neural network to perform the particular task.

The system can use any appropriate off-policy reinforcement learning technique for training the policy neural network.

As one particular example, the system can use an off-line actor-critic technique in which a critic neural network is trained jointly with the policy neural network. An example of such a technique is the Critic-Regularized Regression (CRR) technique. CRR is described in more detail in Ziyu Wang, Alexander Novikov, Konrad Zolna, Jost Tobias Springenberg, Scott Reed, Bobak Shahriari, Noah Siegel, Josh Merel, Caglar Gulcehre, Nicolas Heess, et al. Critic regularized regression.

As another particular example, the system can use a batch reinforcement technique that relies on distributional policy gradients to update the policy neural network or one that relies on non-distributional deterministic policy gradients to update the policy neural network. Batch reinforcement learning is described in more detail in Sascha Lange, Thomas Gabel, and Martin Riedmiller. Batch reinforcement learning. In Reinforcement learning, pages 45-72. Springer, 2012. Distributional policy gradients and non-distributional deterministic policy gradients are described in more detail in Gabriel Barth-Maron, Matthew W. Hoffman, David Budden, Will Dabney, Dan Horgan, Dhruva T B, Alistair Muldal, Nicolas Heess, and Timothy Lillicrap. Distributed distributional deterministic policy gradients. In International Conference on Learning Representations, 2018.

In some implementations, the system first trains the reward prediction model to completion and then trains the policy neural network using the reward prediction model after the reward prediction model has been trained to completion. In other words, the system performs a single iteration of the process 200 to complete the training of the reward prediction model and the policy neural network and the policy neural network is trained on the entire set of robot experience data available to the system in step 208.

In some other implementations, the system repeatedly updates the reward prediction model and the policy neural network by performing the process 200. That is, the system performs multiple iterations of the process 200 during the training of the policy neural network and, at each iteration, trains the reward prediction model and the reward prediction model starting from the values of the respective parameters as of the preceding iteration.

In these implementations, at each iteration, the system can obtain a portion of the entire set of robot experience data. As a particular example, the system can sample a batch of expert experiences and multiple batches of unlabeled experiences from the entire set of robot experience data. The system can then use the batch of expert experiences and one of the batches of unlabeled experiences as the subset on which the reward prediction model is trained and the batch of expert experiences and all of the batches of unlabeled experiences as the data on which the policy neural network is trained.

Figure 3:
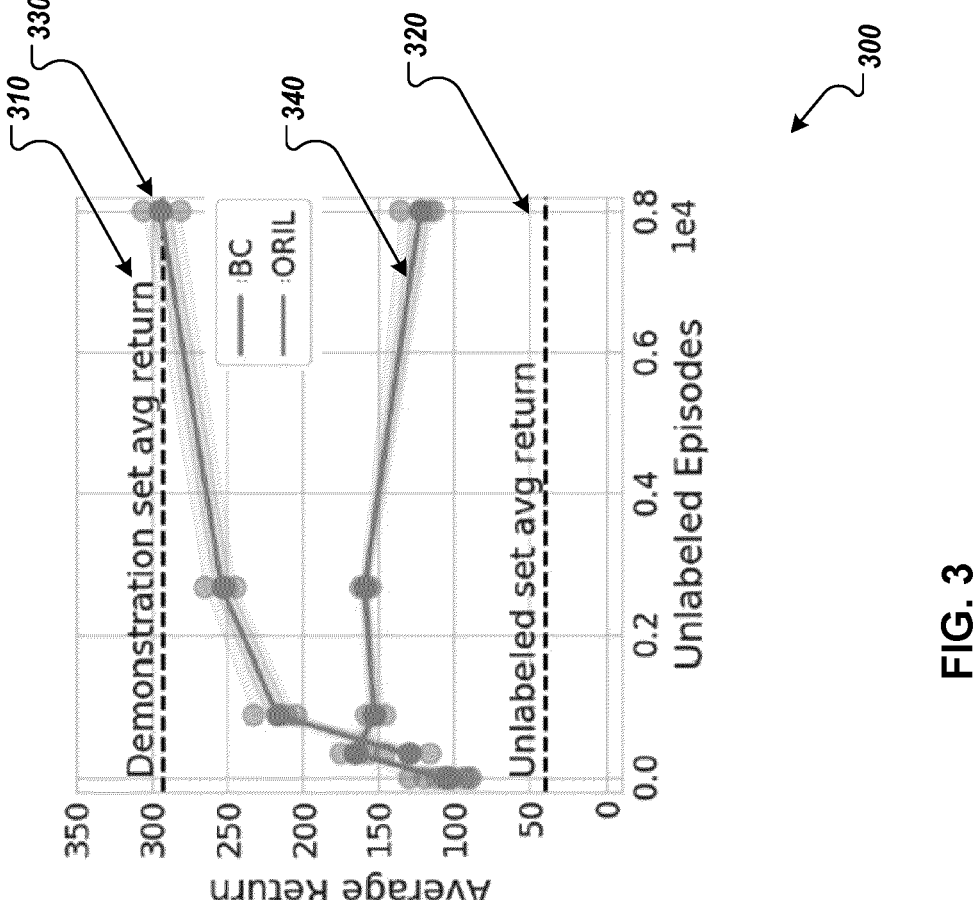
FIG. 3 shows a comparison of the performance of the described training process relative to a conventional training process.

FIG. 3 is a graph 300 shows a comparison of the performance of the described training process relative to a conventional training process.

In particular, FIG. 3 shows the average return 310 of episodes of a particular task being performed as reflected in the expert experience data in a particular set of robot experience data. Because the expert experience data is collected from an expert agent, the average return 310 represents the performance of an expert agent on the particular task, FIG. 3 also shows the average return 320 of episodes being performed as reflected in the unlabeled experiences in the particular set of robot experience data. As can be seen from FIG. 3 and for the reasons described above, the average expert episode has a much higher return than the average unlabeled episode.

FIG. 3 also shows the performance of the described techniques (referred to as Offline Reinforced Imitation Learning (ORIL)) relative to an existing state of the art technique (Behavior cloning (BC)) that also does not rely on pre-existing task rewards.

In particular, they axis of the graph 300 shows the average return and the x axis of the graph 300 shows the number of unlabeled experiences in the robot experience data. The same relatively small number of expert experiences (189) for all numbers of unlabeled experience data.

FIG. 3 shows the performance of ORIL as a curve 330 and the performance of BC as a curve 340.

As can be seen from FIG. 3, ORIL can learn to leverage larger numbers of unlabeled experiences to approach expert level performance, i.e., the curve 330 approaches the average return 310 as the number of unlabeled experiences increases, while the performance of BC decreases when there are significantly more unlabeled experiences than expert experiences in the robot experience data.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

obtaining robot experience data characterizing robot interactions with an environment, the robot experience data comprising a plurality of experiences that each comprise (i) an observation characterizing a state of the environment and (ii) an action performed by a respective robot in response to the observation, wherein the experiences comprise:

expert experiences from episodes of a particular task being performed by an expert agent, and unlabeled experiences;

training, on a first subset of the robot experience data, a reward prediction model that receives a reward input comprising an input observation and generates as output a reward prediction that is a prediction of a task-specific reward for the particular task that should be assigned to the input observation, wherein training the reward prediction model comprises optimizing an objective function that:

includes a first term that encourages the reward prediction model to assign, to observations from expert experiences, a first reward value that indicates that the particular task was completed successfully after the environment was in the state characterized by the observation, and includes a second term that encourages the reward prediction model to assign, to observations from unlabeled experiences, a second reward value that indicates that the particular task was not completed successfully after the environment was in the state characterized by the observation;

processing experiences in the robot experience data using the trained reward prediction model to generate a respective reward prediction for each of the processed experiences; and training a policy neural network on (i) the processed experiences and (ii) the respective reward predictions for the processed experiences, wherein the policy neural network is configured to receive a network input comprising an observation and to generate a policy output that defines a control policy for a robot performing the particular task.

2. The method of claim 1, further comprising:

controlling a robot using the trained policy neural network while the robot performs the particular task.

3. The method of claim 1, further comprising:

providing data specifying the trained policy neural network for use in controlling a robot while the robot performs the particular task.

4. The method of claim 1, wherein the first subset includes the expert experiences and a proper subset of the unlabeled experiences.

5. The method of claim 1, wherein the objective function includes a third term that encourages the reward prediction model to assign, to observations from expert experiences, the second reward value.

6. The method of claim 5, wherein the first and second terms have a different sign from the third term in the objective function.

7. The method of claim 1, wherein the objective function includes a fourth term that penalizes the reward prediction model for correctly distinguishing expert experiences from unlabeled experiences based on a first predetermined number of observations of an episode of the particular task being performed by an expert agent.

8. The method of claim 1, wherein training the policy neural network comprises training the policy neural network on (i) the experiences and (ii) the respective reward predictions for the experiences using an off-line reinforcement learning technique.

9. The method of claim 8, wherein the off-line reinforcement learning technique is Critic-Regularized Regression (CRR).

10. The method of claim 1, wherein the off-line reinforcement learning technique is an off-line actor-critic technique.

11. The method of claim 1, wherein training the reward prediction model comprises applying data augmentation to the experiences in the robot experience data that are used for the training of the reward prediction model.

12. The method of claim 1, wherein at least some of experiences of the first subset of the robotic experience data relate to a real-world environment.

13. The method of any claim 1, further comprising:

controlling a robot using the trained policy neural network while the robot performs the particular task, wherein controlling the robot comprises obtaining observations from one or more sensors sensing a real-world environment, providing the observations to the trained policy neural network, and using an output of the trained policy neural network to select actions to control the robot to perform the particular task.

14. A system comprising one or more computers and one or more storage devices storing instructions that are operable, when executed by the one or more computers, to cause the one or more computers to perform operations comprising:

obtaining robot experience data characterizing robot interactions with an environment, the robot experience data comprising a plurality of experiences that each comprise (i) an observation characterizing a state of the environment and (ii) an action performed by a respective robot in response to the observation, wherein the experiences comprise:

expert experiences from episodes of a particular task being performed by an expert agent, and unlabeled experiences;

training, on a first subset of the robot experience data, a reward prediction model that receives a reward input comprising an input observation and generates as output a reward prediction that is a prediction of a task-specific reward for the particular task that should be assigned to the input observation, wherein training the reward prediction model comprises optimizing an objective function that:

includes a first term that encourages the reward prediction model to assign, to observations from expert experiences, a first reward value that indicates that the particular task was completed successfully after the environment was in the state characterized by the observation, and includes a second term that encourages the reward prediction model to assign, to observations from unlabeled experiences, a second reward value that indicates that the particular task was not completed successfully after the environment was in the state characterized by the observation;

processing experiences in the robot experience data using the trained reward prediction model to generate a respective reward prediction for each of the processed experiences; and training a policy neural network on (i) the processed experiences and (ii) the respective reward predictions for the processed experiences, wherein the policy neural network is configured to receive a network input comprising an observation and to generate a policy output that defines a control policy for a robot performing the particular task.

15. The system of claim 14, the operations further comprising:

controlling a robot using the trained policy neural network while the robot performs the particular task.

16. The system of claim 14, the operations further comprising:

providing data specifying the trained policy neural network for use in controlling a robot while the robot performs the particular task.

17. The system of claim 14, wherein the first subset includes the expert experiences and a proper subset of the unlabeled experiences.

18. The system of claim 14, wherein the objective function includes a third term that encourages the reward prediction model to assign, to observations from expert experiences, the second reward value.

19. The system of claim 18, wherein the first and second terms have a different sign from the third term in the objective function.

20. One or more non-transitory computer-readable storage media encoded with instructions that, when executed by one or more computers, cause the one or more computers to perform operations comprising:

obtaining robot experience data characterizing robot interactions with an environment, the robot experience data comprising a plurality of experiences that each comprise (i) an observation characterizing a state of the environment and (ii) an action performed by a respective robot in response to the observation, wherein the experiences comprise:

expert experiences from episodes of a particular task being performed by an expert agent, and unlabeled experiences;

training, on a first subset of the robot experience data, a reward prediction model that receives a reward input comprising an input observation and generates as output a reward prediction that is a prediction of a task-specific reward for the particular task that should be assigned to the input observation, wherein training the reward prediction model comprises optimizing an objective function that:

includes a first term that encourages the reward prediction model to assign, to observations from expert experiences, a first reward value that indicates that the particular task was completed successfully after the environment was in the state characterized by the observation, and includes a second term that encourages the reward prediction model to assign, to observations from unlabeled experiences, a second reward value that indicates that the particular task was not completed successfully after the environment was in the state characterized by the observation;

processing experiences in the robot experience data using the trained reward prediction model to generate a respective reward prediction for each of the processed experiences; and training a policy neural network on (i) the processed experiences and (ii) the respective reward predictions for the processed experiences, wherein the policy neural network is configured to receive a network input comprising an observation and to generate a policy output that defines a control policy for a robot performing the particular task.

\* \* \* \* \*